(12) United States Patent
Adrovic et al.

(10) Patent No.: US 8,898,367 B2
(45) Date of Patent: Nov. 25, 2014

(54) UNIFIED INFORMATION BUS

(75) Inventors: Ervin Adrovic, Holzgerlingen (DE);
Kalambur Subramaniam, Bangalore (IN); Albrecht Schroth, Herrenberg (DE); Bernhard Kappler, Herrenberg (DE); Harald Burose, Gaufelden (DE)

(73) Assignee: Hewlett-Packard Development Company, L.P., Houston, TX (US)

(*) Notice: Subject to any disclaimer, the term of this patent is extended or adjusted under 35 U.S.C. 154(b) by 357 days.

(21) Appl. No.: 13/383,960

(22) PCT Filed: Mar. 17, 2010

(86) PCT No.: PCT/US2010/027631
§ 371 (c)(1),
(2), (4) Date: Mar. 15, 2012

(87) PCT Pub. No.: WO2011/115619
PCT Pub. Date: Sep. 22, 2011

(65) Prior Publication Data
US 2012/0166698 A1 Jun. 28, 2012

(51) Int. Cl.
*G06F 13/14* (2006.01)
*G06F 13/00* (2006.01)
*G06F 21/72* (2013.01)
*G06F 21/85* (2013.01)

(52) U.S. Cl.
CPC ............ *G06F 21/85* (2013.01); *G06F 21/72* (2013.01); *G06F 2221/2141* (2013.01); *G06F 2221/2107* (2013.01); *G06F 2221/2129* (2013.01); *G06F 2221/2101* (2013.01)
USPC ........................................ 710/316; 710/305

(58) Field of Classification Search
USPC .......... 710/305–306, 311, 316; 709/238, 246, 709/232; 707/602, 754–756
See application file for complete search history.

(56) References Cited

U.S. PATENT DOCUMENTS

| | | | |
|---|---|---|---|
| 6,820,135 B1* | 11/2004 | Dingman et al. | 709/246 |
| 2005/0154758 A1 | 7/2005 | Childress et al. | |
| 2007/0011726 A1* | 1/2007 | Choi | 726/5 |
| 2008/0083020 A1 | 4/2008 | Hatano | |
| 2008/0134342 A1 | 6/2008 | Shamoon | |
| 2009/0113542 A1 | 4/2009 | Price | |
| 2010/0070735 A1* | 3/2010 | Chen et al. | 711/206 |

FOREIGN PATENT DOCUMENTS

| | | |
|---|---|---|
| JP | 200188626 A | 7/2000 |
| JP | 2006031818 A | 2/2006 |
| KR | 10-2008-0087064 A | 9/2008 |
| WO | WO-2007063482 A2 | 6/2007 |
| WO | WO 2008091037 A1 * | 7/2008 ............ H04L 12/24 |

OTHER PUBLICATIONS

Hohpe, Gregor, et al. "Content-Based Router". Enterprise Integration Patterns. Online 2003. Retrieved from Internet Apr. 28, 2014. <http://enterpriseintegrationpatterns.com/ContentBasedRouter.html>.*
PCT; "Notification of Transmittal of the International Search Report and the Written Opinion of the International Searching Authority, or the Declaration" for PCT/US2010/027631 mailed Dec. 1, 2010; 9 pages.

* cited by examiner

*Primary Examiner* — Thomas J Cleary (57) ABSTRACT

Systems, methods, and other embodiments associated with unified information bus are described. One example method includes receiving a unified information object that includes data and associated meta-data; identifying an object type for the unified information object, selecting one or more data transfer components that perform operations on the identified object type and transferring the unified information object to the one or more selected data transfer components.

19 Claims, 5 Drawing Sheets

UNIFIED INFORMATION BUS

CROSS-REFERENCE TO RELATED APPLICATION

This application is a national stage application under 35 U.S.C. §371 of PCT/US2010/027631, filed 17 Mar. 2010.

BACKGROUND

Information Management today consists of a wide variety of applications ranging from data protection, file and database archival to document management. these types of applications typically involve data movement and transformation, which is made more complex because the data being transferred tends to include both data and meta-data. Information Management applications deploy their agents onto multiple clients and these agents are responsible for transferring data. Applications with different needs such as protection or archival tend to install different agents onto the same client that often perform similar tasks.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Systems, methods, and other embodiments that automate and reduce complexity of information management are described. Organizations use a variety of systems that produce information. Managing the information produced by an organization's systems is often an important part of the organization's operations. Examples of an organization's systems include e-mail servers, relational databases, web servers, and computers used by individuals within the organization. Many organizations wish to maintain archives of information produced by the organizations' systems. Archival of systems information permits retrieval in the event of a systems failure, as well as later analysis of the systems information. Similarly, an organization may wish to encrypt information before it is stored or to share information between systems. These tasks are part of the organization's information management.

Generally, a system defines its own data formats and methods for retrieval or transformation of the data stored by the system. Therefore, integration of multiple disparate systems into the organization's information management hierarchy can involve significant work by a systems administrator. In addition, these systems lack the ability to clearly separate data and associated meta data, further complicating the transfer of data. The systems administrator is responsible for an element of the information management hierarchy being able to communicate with the other elements of the hierarchy. Further, the systems administrator often is tasked with monitoring information management tasks to ensure that the tasks run correctly and to completion. Due to the complexity of integrating various systems into the organization's information management hierarchy, systems and methods to automate and reduce complexity of information management processes can improve information management within the organization.

A unified information bus can be used to transfer both data and associated meta-data across clients. Data transfer across the bus is handled by a set of coordinating components that act as a filter chain to move, transform and classify both data and meta-data from a set of sources to a set of destinations. Thus, any meta-data added by a data transfer component can be understood by data transfer components downstream.

The use of a unified information bus allows different information management tasks to be connected to the bus in without requiring modifications to the applications. The unified information bus provides for the transfer of both data and associated meta-data across multiple coordinating components in a manner that is transparent to the various applications with respect to the specifics of data transfer like setting up connections, buffering, etc . . . Further, the bus may provide for security/access control as part of the bus to prevent unauthorized access to important information. The unified information bus is flexible in that it allows common operations such as encryption to be moved into the bus.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, executable instructions stored on an electronic storage medium, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Figure 1:
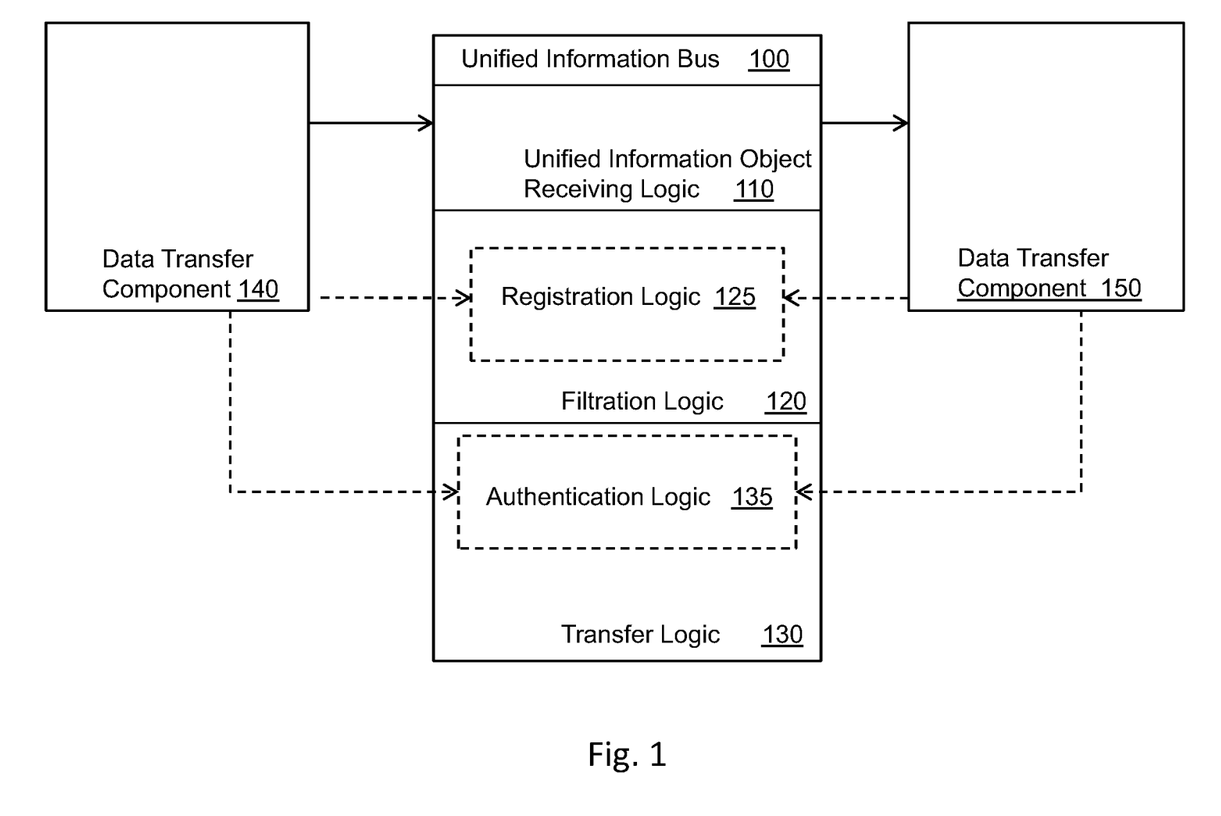
FIG. 1 illustrates an example embodiment of a system associated with a unified information bus.

FIG. 1 illustrates an example embodiment of a unified information bus 100 transferring unified information objects between data transfer components 140, 150. A unified information object is a data object that encapsulates data and any associated meta-data. The data transfer components 140, 150 are connected by the unified information bus 100 to perform coordinated data transfer. For example, the data transfer components 140, 150 may perform such operations as inserting objects onto the bus, replacing a current object by a new object, transforming data or meta-data in a current object, deleting an object, mirroring an object by making two copies of the object and feeding the copies to two different streams, or merging two or more streams of objects into a single stream.

The unified information bus 100 includes a unified information object receiving logic 110 that is configured to receive a unified information object. The unified information object may include both data and meta-data and the unified information bus 100 is capable of distinguishing and keeping the data and meta-data components separate during transfers. While unified information objects are shown as being processed sequentially, in some embodiments, they may be processed in parallel.

The unified information bus 100 includes a filtration logic 120 configured to apply one or more filters to a received unified information object. Each filter is associated with a data transfer component that performs operations on unified information objects. Thus, the various data transfer components connected by the unified information bus act as a filter chain. Some of the data transfer components may act as data sources, some may act as data sinks, and others may transform data by, for example, encrypting or compressing the data. The data transfer components may alter either data, meta-data, both data and meta-data, or neither data nor meta-data. The unified information bus 100 also includes a transfer logic 130 that is configured to transfer the unified information object to a data transfer component associated with a filter that passes the received unified information object.

In some example embodiments, the unified information bus 100 includes a registration logic 125 configured to register one or more filters corresponding to one or more types of unified information objects on which a given data transfer component is configured to operate. The filter associated with a data transfer component is configured to pass the types of objects for which the data transfer component is registered. Thus, prior to commencing operation on data on the bus, a data transfer component may register with the bus to access certain types of objects being transferred on the bus. The bus then delivers objects to the data transfer component that correspond to the filter registered by the data transfer component. The data transfer component may then perform one or more operations on unified information objects flowing on the unified information bus.

In some example embodiments, the unified information bus 100 includes an authentication logic 135 that is configured to receive authentication information for a data transfer component that verifies that the data transfer component meets predetermined security criteria. Thus, each component may authenticate itself to the bus before commencing operation on unified information objects on the bus. On authentication, the data transfer component provides a component type that is used by the bus to determine the type of operations permissible (i.e., read/write/add/delete) by the data transfer component on the bus. In addition, the data transfer component may be given access to selective information on the bus. For example, some data transfer components may have read access only to meta data while others may have read/write access to meta data, but only read access to data, and so on. The transfer logic 130 transfers unified information objects only to data transfer components for which authentication information has been received and for which the data transfer component has been granted access.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 2:
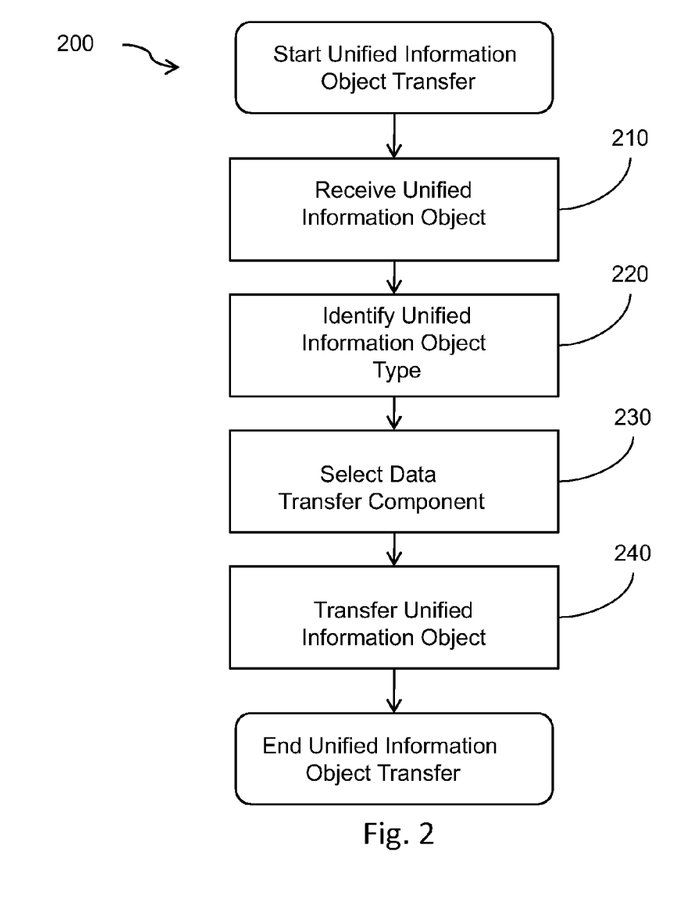
FIG. 2 illustrates an example embodiment of a method associated with a unified information bus.

FIG. 2 illustrates a method 200 associated with a unified information bus. The method 200 includes, at 210, receiving a unified information object that includes data and associated meta-data. At 220 an object type is identified for the unified information object. This identification may be performed by applying a filter to the unified information object. At 230 one or more data transfer components is selected that perform operations on the identified object type. At 240 the unified information object is transferred to the one or more selected data transfer components.

When the unified information bus is disposed between data transfer objects, the method may also include receiving an output unified information object from a data transfer component; identifying, with the bus, an object type for the output unified information object; selecting, with the bus, one or more data transfer components that perform operations on the identified object type; and transferring, with the bus, the output unified information object to the one or more selected data transfer components.

In one example, a method may be implemented as computer executable instructions. Thus, in one example, a computer-readable medium may store computer executable instructions that if executed by a machine (e.g., processor) cause the machine to perform a method that includes receiving a unified information object that includes data and associated meta-data. The method identifies an object type for the unified information object. This identification may be performed by applying a filter to the unified information object. The method selects one or more data transfer components that perform operations on the identified object type. The method then transfers the unified information object to the one or more selected data transfer components.

While executable instructions associated with the above method are described as being stored on a computer-readable medium, it is to be appreciated that executable instructions associated with other example methods described herein may also be stored on a computer-readable medium. In one embodiment, the computer-readable medium is a non-transitory medium.

Figure 3:
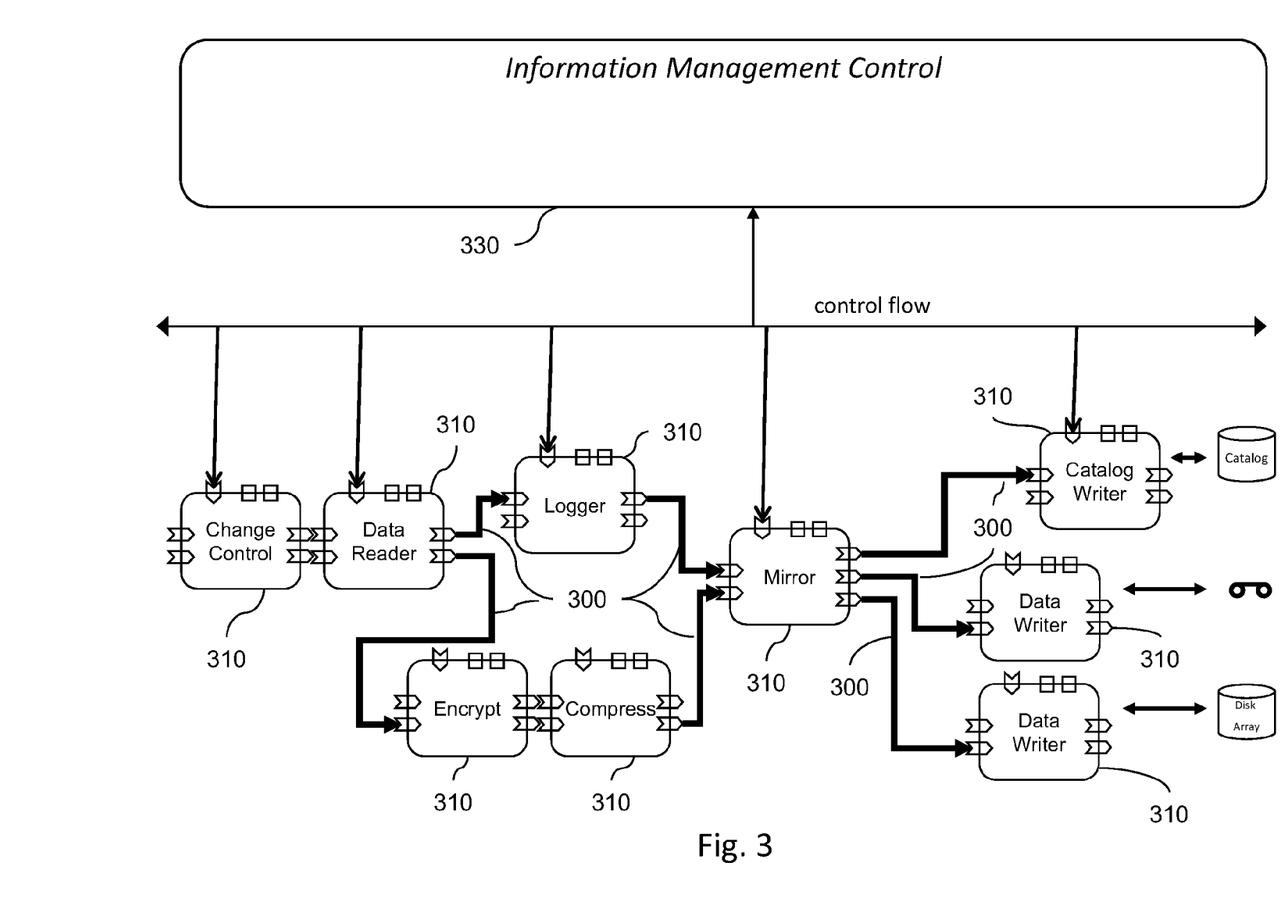
FIG. 3 illustrates another example embodiment of a system associated with a unified information bus.

FIG. 3 illustrates an example embodiment of a system that includes a unified information bus 300. The unified information bus 300 includes data flowing between data transfer components 310 that perform various operations on the unified information objects presented to them by the bus 300. The system includes an information management control system 330 that builds the bus 300 and controls the various data transfer components 310. In the described embodiment, the information management control 330 is located on a server on which management components reside.

The information management control 330 deploys the data transfer components 310 on various clients and executes jobs at their prescribed time. The data transfer components 310 are part of a filter chain and are connected together and perform coordinated data transfer. As already discussed, the data transfer components perform various operations on the unified information objects. The data from one data transfer component 310 to another flows on the unified information bus 300. For example, encrypted data and encryption metadata (such as encryption keys) from an encrypting data transfer component may flow out of the component onto the unified information bus 300. The data transfer components execute on the clients as controlled by the information management control system 330.

Figure 4:
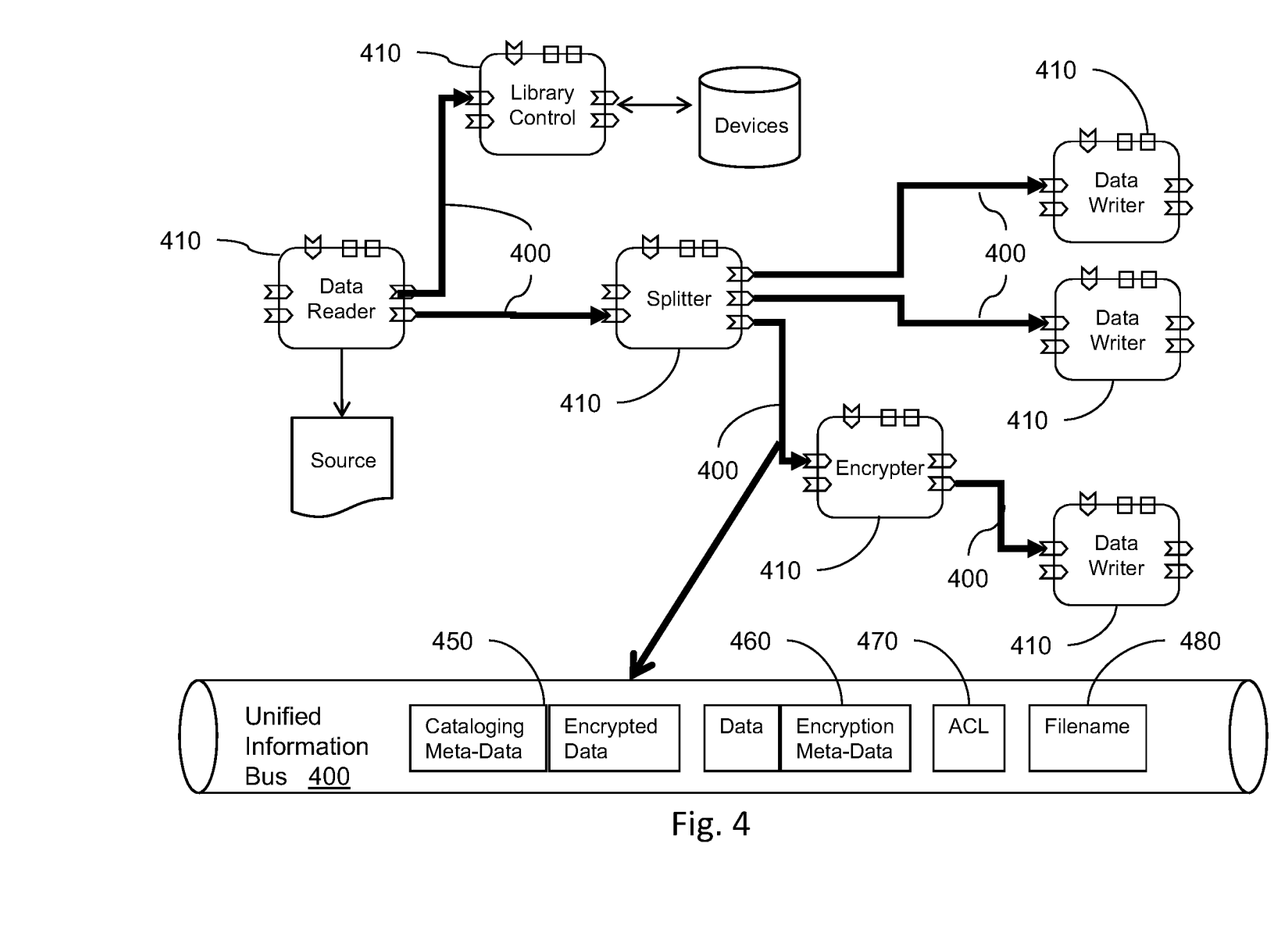
FIG. 4 illustrates another example embodiment of a system associated with a unified information bus.

FIG. 4 illustrates an example embodiment of a unified information bus 400 that transfers data between various data transfer components 410. Filters 450, 460, 470, 480 are registered with the bus 400 and are applied to unified information objects to control the transfer of objects between data transfer components. For example, the filter 450 passes unified information objects that include cataloging meta-data with encrypted data. Unified information objects that pass the filter 450 may be routed to a data transfer component that catalogs encrypted data. The filter 460 passes unified information objects that include data and encryption meta-data. Objects that pass the filter 460 may be routed to a data transfer component that encrypts the data per the encryption meta-data.

Figure 5:
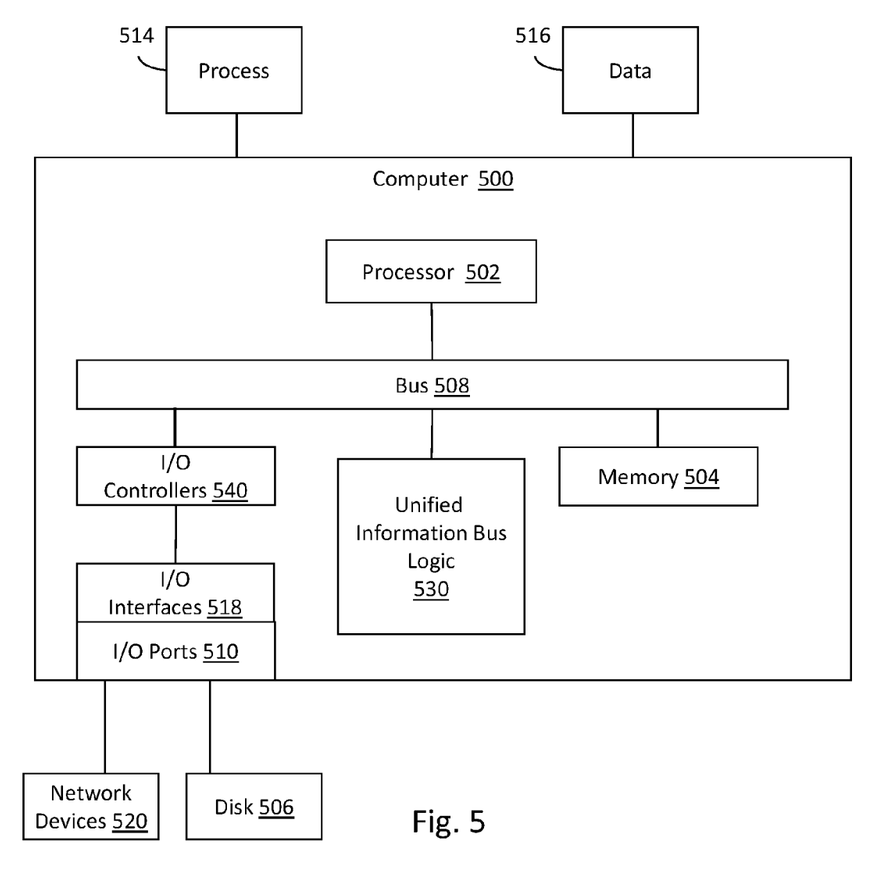
FIG. 5 illustrates an example computing environment in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include an unified information bus logic 530 configured to facilitate transfer of unified information objects. In different examples, the logic 530 may be implemented in hardware, software stored as computer executable instructions on a computer-readable medium, firmware, and/or combinations thereof. While the logic 530 is illustrated as a hardware component attached to the bus 508, it is to be appreciated that in one example, the logic 530 could be implemented in the processor 502.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM (read only memory), PROM (programmable ROM), and so on. Volatile memory may include, for example, RAM (random access memory), SRAM (synchronous RAM), DRAM (dynamic RAM), and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM (compact disk) drive, a CD-R (CD recordable) drive, a CD-RW (CD rewriteable) drive, a DVD (digital versatile disk and/or digital video disk) ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCI (peripheral component interconnect), PCIE (PCI express), 1394, USB (universal serial bus), Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN (local area network), a WAN (wide area network), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A computer-implemented method, comprising:
receiving, by bus logic, a unified information object encapsulating data and associated meta-data, wherein the bus logic is included in an information bus connecting a plurality of data transfer components, wherein the bus logic includes a plurality of filters, wherein each filter of the plurality of filters is uniquely associated with one of the plurality of data transfer components;
identifying, using the plurality of filters, an object type for the unified information object by filtering the data and the associated meta-data encapsulated in the unified information object;
selecting, from the plurality of data transfer components, one or more data transfer components that perform operations on the identified object type; and
transferring, by the bus logic, the unified information object to the one or more data transfer components.

2. The computer-implemented method of claim 1 comprising:
in response to a connection of a first data transfer component to the information bus, registering, by the bus logic, a first filter uniquely associated with the first data transfer component, where the first filter identifies one or more types of objects on which the first data transfer component is configured to operate.

3. The computer-implemented method of claim 1 comprising:
receiving, by the bus logic, authentication information for a data transfer component that verifies that the data transfer component meets predetermined security criteria;
where the bus logic transfers unified information objects only to data transfer components for which authentication information has been received.

4. The computer-implemented method of claim 1 comprising:
receiving, with the bus, a component type associated with each of the plurality of data transfer components;

where the bus logic selects the one or more data transfer components based, at least in part, on the component type associated with each of the one or more data transfer components.

5. The computer-implemented method of claim 1 comprising:

receiving, by the bus logic, a second unified information object from a second data transfer component of the plurality of data transfer components;

identifying, by the bus logic, an object type for the second unified information object;

selecting, from the plurality of data transfer components, a set of data transfer components that perform operations on the identified object type; and transferring, by the bus logic, the second unified information object to the set of data transfer components.

6. The computer-implemented method of claim 5 where the second data transfer component generates the second unified information object by transforming data included in a third unified information object that was input to the first data transfer component.

7. The computer-implemented method of claim 6 where the second data transfer component generates the second unified information object by transforming meta-data included in the third unified information object that was input to the first data transfer component.

8. The computer-implemented method of claim 1 further comprising:

connecting a first data transfer component to the information bus;

registering, by the bus logic, a first filter uniquely associated with the first data transfer component;

determining, by the bus logic, whether the data and the associated meta-data encapsulated in the unified information object match the first filter; and in response to a determination that the data and the associated meta-data encapsulated in the unified information object match the first filter, transferring the unified information object to the first data transfer component.

9. The computer-implemented method of claim 8 further comprising:

transforming, by the first data transfer component, the unified information object to obtain an output unified information object;

determining, by the bus logic, whether data and the associated meta-data encapsulated in the output unified information object match a second filter, wherein the second filter is associated with a second data transfer component; and in response to a determination that the data and the associated meta-data encapsulated in the output unified information object match the second filter, transferring the output unified information object to the second data transfer component.

10. A unified information bus comprising:

a unified information object receiving logic to receive a unified information object encapsulating data and associated meta-data, wherein the unified information bus connects a plurality of data transfer components;

a filtration logic to apply a plurality of filters to the data and the associated meta-data encapsulated in the unified information object, where each filter of the plurality of filters is uniquely associated with one of the plurality of data transfer components, where a first filter of the plurality of filters passes the unified information object, where the first filter is uniquely associated with a first data transfer component of the plurality of data transfer components; and a transfer logic to transfer the unified information object to the first data transfer component associated with the first filter that passes the received unified information object.

11. The unified information bus of claim 10 comprising:

a registration logic to, in response to a connection of a particular data transfer component to the information bus, register a particular filter uniquely associated with the particular data transfer component, where the particular filter identifies one or more types of objects on which the particular data transfer component is configured to operate.

12. The unified information bus of claim 10 comprising:

an authentication logic to receive authentication information for a data transfer component that identifies levels of access to selected information on the bus to be granted to the data transfer component;

where the transfer logic transfers unified information objects only to data transfer components that have been granted access to a given unified information object.

13. A computer-readable medium storing computer-executable instructions that when executed by a computer cause the computer to perform a method, the method comprising:

receiving, by bus logic, a unified information object encapsulating data and associated meta-data, wherein the bus logic is included in an information bus connecting a plurality of data transfer components, wherein the bus logic includes a plurality of filters, wherein each filter of the plurality of filters is uniquely associated with one of the plurality of data transfer components;

identifying, using the plurality of filters, an object type for the unified information object by filtering the data and the associated meta-data encapsulated in the unified information object;

selecting, by the bus logic, one or more data transfer components that perform operations on the identified object type; and transferring, by the bus logic, the unified information object to the one or more data transfer components.

14. The computer-readable medium of claim 13 where the method comprises:

in response to a connection of a first data transfer component to the information bus, registering, by the bus logic, a first filter uniquely associated with the first data transfer component, where the first filter identifies one or more types of objects on which the first data transfer component is configured to operate.

15. The computer-readable medium of claim 13 where the method comprises:

receiving, by the bus logic, authentication information for a data transfer component of the plurality of data transfer components, wherein the authentication information verifies that the data transfer component meets predetermined security criteria;

where the bus logic transfers unified information objects only to data transfer components for which authentication information has been received.

16. The computer-readable medium of claim 13 where the method comprises:

receiving, by the bus logic, a component type associated with the one or more data transfer components, where the bus logic selects the one or more data transfer components based, at least in part, on the component type associated with the one or more data transfer components.

17. The computer-readable medium of claim 13 where the method comprises:
- receiving, by the bus logic, a second unified information object from a second data transfer component of the plurality of data transfer components;
- identifying, by the bus logic, an object type for the second unified information object;
- selecting, from the plurality of data transfer components, a set of data transfer components that perform operations on the identified object type; and
- transferring, by the bus logic, the second unified information object to the set of data transfer components.

18. The computer-readable medium of claim 13 where the method comprises:
- connecting a first data transfer component to the information bus;
- registering, by the bus logic, a first filter uniquely associated with the first data transfer component;
- determining, by the bus logic, whether the data and the associated meta-data encapsulated in the unified information object match the first filter; and
- in response to a determination that the data and the associated meta-data encapsulated in the unified information object match the first filter, transferring the unified information object to the first data transfer component.

19. The computer-readable medium of claim 18 where the method comprises:
- transforming, by the first data transfer component, the unified information object to obtain an output unified information object;
- determining, by the bus logic, whether data and the associated meta-data encapsulated in the output unified information object match a second filter, wherein the second filter is associated with a second data transfer component; and
- in response to a determination that the data and the associated meta-data encapsulated in the output unified information object match the second filter, transferring the output unified information object to the second data transfer component.

* * * * *